(12) United States Patent
Nielsen et al.

(10) Patent No.: US 12,437,391 B2
(45) Date of Patent: Oct. 7, 2025

(54) MEDICAL SCAN PROTOCOL FOR IN-SCANNER PATIENT DATA ACQUISITION ANALYSIS

(71) Applicant: Cerebriu A/S, Copenhagen (DK)

(72) Inventors: Mads Nielsen, Dragør (DK); Robert Megraw Lauritzen, København Ø (DK); Akshay Sadananda Uppinakudru Pai, Søborg (DK)

(73) Assignee: Cerebriu A/S, Coenhagen (DE)

( * ) Notice: Subject to any disclaimer, the term of this patent is extended or adjusted under 35 U.S.C. 154(b) by 176 days.

(21) Appl. No.: 17/621,668

(22) PCT Filed: Jun. 26, 2020

(86) PCT No.: PCT/EP2020/068168
§ 371 (c)(1),
(2) Date: Dec. 21, 2021

(87) PCT Pub. No.: WO2020/260671
PCT Pub. Date: Dec. 30, 2020

(65) Prior Publication Data
US 2023/0252622 A1      Aug. 10, 2023

(30) Foreign Application Priority Data

Jun. 26, 2019    (GB) .................................. 1909212

(51) Int. Cl.
*G06T 7/00*    (2017.01)
*A61B 5/00*    (2006.01)
(Continued)

(52) U.S. Cl.
CPC ............ *G06T 7/0012* (2013.01); *A61B 5/055* (2013.01); *A61B 5/746* (2013.01); *G06V 10/22* (2022.01);
(Continued)

(58) Field of Classification Search
CPC ......... G06T 7/0012; G06T 2207/10081; G06T 2207/10088; G06T 2207/10104;
(Continued)

(56) References Cited

U.S. PATENT DOCUMENTS

2004/0127799 A1    7/2004 Sorensen et al.
2006/0034503 A1    2/2006 Shimayama
(Continued)

FOREIGN PATENT DOCUMENTS

CN    108206052 A    6/2018
JP    2008173175 A    7/2008
(Continued)

OTHER PUBLICATIONS

Pawel Mlynarski, Hervé Delingette, Antonio Criminisi, Nicholas Ayache, "3D convolutional neural networks for tumor segmentation using long-range 2D context", Computerized Medical Imaging and Graphics, vol. 73,2019, 2019, pp. 60-72, ISSN 0895-6111, (Year: 2019).*

(Continued)

*Primary Examiner* — Joel Lamprecht
*Assistant Examiner* — Amy Shafqat
(74) *Attorney, Agent, or Firm* — IPro, PLLC

(57) ABSTRACT

There is provided a method of performing a medical scan of a subject using a medical imaging system, the method comprising: a) initiating a medical scan session; b) performing, using the medical imaging system, a first image acquisition sequence during the medical scan session to obtain first image scan data; c) performing, using a computer system, image analysis on the first image scan data acquired during said first image acquisition sequence to identify one or more quantitative indicators of pathology and/or image quality; d) based on said identification of one or more quantitative indicators at step c), determining, using the (Continued)

computer system, whether any additional image acquisition sequences are required during said medical scan session; and, if so required: e) determining, using the computer system, a second image acquisition sequence based on the one or more quantitative indicators; and f) performing, using the medical imaging system, a second image acquisition sequence during the medical scan session to obtain second image scan data.

23 Claims, 6 Drawing Sheets

(51) Int. Cl.
    *A61B 5/055* (2006.01)
    *G06V 10/22* (2022.01)
    *G06V 10/764* (2022.01)

(52) U.S. Cl.
    CPC .. *G06V 10/764* (2022.01); *G06T 2207/10081* (2013.01); *G06T 2207/10088* (2013.01); *G06T 2207/10104* (2013.01); *G06T 2207/20081* (2013.01); *G06T 2207/20084* (2013.01); *G06T 2207/30004* (2013.01); *G06T 2207/30168* (2013.01)

(58) Field of Classification Search
    CPC . G06T 2207/20081; G06T 2207/20084; G06T 2207/30004; G06T 2207/30168; G06T 2207/30096; G06T 7/00; G06T 2207/1007; A61B 5/055; A61B 5/746; A61B 6/032; G06V 10/22; G06V 10/764; G06V 2201/031; G06F 18/2431; G16H 30/20; G16H 30/40; G16H 50/20
    See application file for complete search history.

(56) References Cited

U.S. PATENT DOCUMENTS

| | | | |
|---|---|---|---|
| 2017/0243336 | A1 | 8/2017 | Zou et al. |
| 2017/0270695 | A1* | 9/2017 | Avinash ............... A61B 6/507 |
| 2020/0170509 | A1* | 6/2020 | Eide ................ A61K 49/0438 |

FOREIGN PATENT DOCUMENTS

| | | | |
|---|---|---|---|
| JP | 2010131221 | A | 6/2010 |
| WO | 0156466 | A2 | 8/2001 |
| WO | 2017160531 | A1 | 9/2017 |
| WO | 2019086337 | A1 | 5/2019 |
| WO | 2019112050 | A1 | 6/2019 |

OTHER PUBLICATIONS

JHM Brain Tumor Information (Year: 2024).*
Mlynarski, Pawel, et al. "3D convolutional neural networks for tumor segmentation using long-range 2D context." Computerized Medical Imaging and Graphics 73 (2019): 60-72.
Chen, Wei, et al. "S3D-UNet: separable 3D U-Net for brain tumor segmentation." Brainlesion: Glioma, Multiple Sclerosis, Stroke and Traumatic Brain Injuries: 4th International Workshop, BrainLes 2018, Held in Conjunction with MICCAI 2018, Granada, Spain, Sep. 16, 2018, Revised Selected Papers, Part II 4. Springer International Publishing, 2019.
Ronneberger, Olaf, Philipp Fischer, and Thomas Brox. "U-net: Convolutional networks for biomedical image segmentation." Medical image computing and computer-assisted intervention—MICCAI 2015: 18th international conference, Munich, Germany, Oct. 5-9, 2015, proceedings, part III 18. Springer international publishing, 2015.
Myronenko, Andriy. "3D MRI brain tumor segmentation using autoencoder regularization." International MICCAI brainlesion workshop. Cham: Springer International Publishing, 2018.
Liu, Hongying, et al. "CU-Net: Cascaded U-Net with loss weighted sampling for brain tumor segmentation." Multimodal Brain Image Analysis and Mathematical Foundations of Computational Anatomy: 4th International Workshop, MBIA 2019, and 7th International Workshop, MFCA 2019, Held in Conjunction with MICCAI 2019, Shenzhen, China, Oct. 17, 2019, Proceedings 4. Springer International Publishing, 2019.
Isensee, Fabian, et al. "nnu-net: Self-adapting framework for u-net-based medical image segmentation." arXiv preprint arXiv:1809.10486 (2018).
Simard, Patrice Y., David Steinkraus, and John C. Platt. "Best practices for convolutional neural networks applied to visual document analysis." Icdar. vol. 3. No. 2003. 2003.
Orbes-Arteaga, Mauricio, et al. "PADDIT: probabilistic augmentation of data using diffeomorphic image transformation." Medical Imaging 2019: Image Processing. vol. 10949. SPIE, 2019.
Zou, Bin, Akshay Pai, and M. Nielsen. "Simultaneous registration and bilateral differential bias correction in brain mri." IntellMR, MICCAI workshop. 2014.
Kushibar, Kaisar, et al. "Automated sub-cortical brain structure segmentation combining spatial and deep convolutional features." Medical image analysis 48 (2018): 177-186.
Perslev, M., Pai, A. S. U., Igel, C., and Dam, E. B. (2018). Knee Segmentation by Multiplanar Deep LearningNetwork—with data from OAI. Abstract from 12th International Workshop on Osteoarthritis Imaging, Menton, France.
Iglesias, Juan Eugenio, et al. "Robust brain extraction across datasets and comparison with publicly available methods." IEEE transactions on medical imaging 30.9 (2011): 1617-1634.
Chengfei Cai, et al. "Deep Convolutional Networks for identifying multiple tissues from colorectal histologic imae of whole slide." Chinese Journal of Biomedical Engineering 36.5 (2017): 632-636.
Wang, Chengjia, et al. "A two-stage 3D Unet framework for multi-class segmentation on full resolution image." arXiv preprint arXiv:1804.04341 (2018).

* cited by examiner

MEDICAL SCAN PROTOCOL FOR IN-SCANNER PATIENT DATA ACQUISITION ANALYSIS

TECHNICAL FIELD

The present invention relates to an improved method of, and apparatus for, in-scanner patient data acquisition analysis. More particularly, the present invention relates to an improved method of, and apparatus for, scan selection and acquisition in response to one or more indicators. At least one indicator may comprise a pathology indicating metric or quantitative parameter.

BACKGROUND

A non-invasive technique for imaging brain and other body regions is computerised tomography (CT) scans which combine a series of X-ray images taken from different angles around the body and use computational methods to create cross-sectional images (slices) of the bones, blood vessels and soft tissues inside the body.

Another technique is positron emission tomography (PET) which can be used to produce detailed 3-dimensional images of the inside of a body. A PET scan utilises radiotracers, which are molecules comprising a small amount of radioactive material that can be detected on the PET scan. They are designed to accumulate in cancerous tumours or regions of inflammation. They can also be made to bind to specific proteins in the body.

An increasingly preferred technique is structural magnetic resonance imaging (MRI). MRI is a non-invasive technique for examining the physical structure of the body (for example, calculation of the volumes of tissue). This is of high value for monitoring tissue damage and, particularly, neurodegenerative diseases.

As is well known, MRI is based on the magnetisation properties of atomic nuclei. A large and uniform external magnetic field aligns proteins within the water nuclei of the tissue under examination. The alignment is then perturbed by an external radio frequency (RF) signal.

The nuclei return to a resting alignment through numerous different relaxation processes, during which RF signals are emitted. By varying the emission and detection sequences of RF pulses, different characteristics of the tissue under examination can be measured. Repetition Time (TR) is the amount of time between successive pulse sequences applied to the same slice. Time to Echo (TE) is the time between the delivery of the RF pulse and the receipt of the echo signal.

Numerous MRI techniques are available. T1-weighted and T2-weighted scans are common. T1 (longitudinal relaxation time) is a time constant determining the rate at which excited protons realign with the applied external magnetic field. T2 (transverse relaxation time) is a time constant determining the rate at which excited protons lose phase coherence with the nuclei having a spin perpendicular to the applied external magnetic field. T1-weighted images are characterised by short TE and TR times. Conversely, T2-weighted images are produced by using longer TE and TR times.

An increasingly used sequence is the Fluid Attenuated Inversion Recovery (FLAIR). FLAIR is similar to a T2-weighted image except that the TE and TR times are very long. Using this approach, abnormalities remain bright but cerebrospinal fluid is attenuated and so is dark in the obtained image. Such a system is also referred to as a T2 FLAIR scan.

Diffusion-weighted imaging (DWI) is a form of MRI based upon measuring a random Brownian motion of water molecules within a voxel (volume pixel) of measured tissue. In general, highly cellular tissues or those with cellular swelling exhibit lower diffusion coefficients. Diffusion is particularly useful in tumour characterisation and cerebral ischaemia.

Contrast-enhanced MRI (CE-MRI) and Dynamic Contrast-Enhanced MRI (DCE-MRI) are also available techniques. In CE-MRI, Gadolinium contrast is used to improve the clarity of the imaging available. CE-MRI can improve the visibility of inflammation, blood vessels, and tumours, for example. DCE-MRI, multiple MR images are acquired sequentially following administration of contrast. This allows the contrast of contrast ("wash in" and "wash out") to be monitored, enabling improved detection of, for example, vascular lesions and tumours.

A yet further technique is a gradient echo (GRE) MRI scan. This is produced by a single RF pulse in combination with a gradient reversal. Following an RF pulse, a first negative part of a lobe of the gradient causes a phase dispersion of the precessing spins.

Upon reversal of this gradient is reversed, the spins refocus and form a gradient (recalled) echo. A GRE scan typically involves short TR and short TE values and so provides for rapid signal acquisition. Consequently, GRE sequences can provide rapid imaging and MR angiographic techniques.

Susceptibility weighted imaging (SWI) is a 3D high-spatial resolution velocity-corrected gradient echo MRI sequence which utilises compounds having paramagnetic, diamagnetic, and ferromagnetic properties. Such paramagnetic compounds include deoxyhaemoglobin, ferritin and haemosiderin. Diamagnetic compounds include bone minerals and dystrophic calcifications.

A variant of GRE is a susceptibility weighted angiography (SWAN). SWAN allows for high-resolution visualisation of both cerebral veins and arteries in one sequence without application of contrast agent and with significantly shortened scan time than other arrangements.

Turbo spin echo (TSE) (also known as Fast Spin Echo-FSE) is an adaptation of the normal spin-echo (SE) acquisition technique designed to reduce imaging time. In a standard SE sequence, a single echo is measured during each repetition time (TR). IN TSE, multiple echoes are recorded after each TR. This is achieved by transmitting a series of 180-degree inversion pulses at predetermined intervals and recording the corresponding echo signal according to a different phase encoding gradient. In this way, multiple phase-encoded steps can be encoded after a single 90-degree pulse.

The above is a non-exhaustive list and other techniques may be contemplated.

A scan may involve one or more of the above tests. Often, the techniques are combined to provide enhanced medical data in a process known as co-registration or image fusion. Indeed, scanners are available which are able to carry out multiple diagnostic methods in a single scan; for example, single photon emission computed tomography/computed tomography (SPECT/CT) and positron emission tomography/computed tomography (PET/CT) units that are able to perform multiple imaging examinations simultaneously.

There are a number of problems with existing scan arrangements, irrespective of the techniques used. A patient scan is expensive for the service provider and potentially inconvenient and stressful for the patient. Therefore, it is desirable to minimise the number of times a patient needs to be scanned.

However, patient scan data is often acquired and, when later analysed, the scan data is found to be unusable in a diagnostic process due to incorrect or insufficient acquisition, or due to quality control defects which result in the image quality being too poor for medical diagnostic purposes. In such an eventuality, the patient has to be later recalled for further scans. This is clearly undesirable, and may (for example, in the case of the use of PET, or where contrast is utilised) lead to the patient being exposed to additional and unnecessary risk.

SUMMARY

Therefore, there exists a need in the art for an improved process which reduces the likelihood of a patient being recalled for a further scan to enable further imagery to be acquired. There exists a technical problem that existing methods for scan data acquisition are too slow and insufficiently adaptive to enable all necessary data to be acquired during a single scan session and to prevent unnecessary scanning steps being taken.

The present invention, in embodiments, addresses the above issues. The present invention as described and claimed below may be used with, but is not limited to, all the above described techniques.

According to a first aspect of the present invention there is provided a method of performing a medical scan of a subject using a medical imaging system, the method comprising: a) initiating a medical scan session; b) performing, using the medical imaging system, a first image acquisition sequence during the medical scan session to obtain first image scan data; c) performing, using a computer system, image analysis on the first image scan data acquired during said first image acquisition sequence to identify one or more quantitative indicators of pathology and/or image quality; d) based on said identification of one or more quantitative indicators at step c), determining, using the computer system, whether any additional image acquisition sequences are required during said medical scan session; and, if so required: e) determining, using the computer system, a second image acquisition sequence based on the one or more quantitative indicators; and f) performing, using the medical imaging system, a second image acquisition sequence during the medical scan session to obtain second image scan data.

In one embodiment, the first and/or second image scan data comprises two-dimensional image scan data. In one embodiment, the first and/or second image scan data comprises three-dimensional image scan data.

In one embodiment, the first and/or second image scan data comprises one or more images of a selected body part of the subject. In one embodiment, the first and/or second image scan data comprises one or more 2D and/or 3D images of the selected body part of the subject.

In one embodiment, said quantitative indicators are derived from a prior training process utilising unrelated image scan data.

In one embodiment, step c) is performed using a classifier and said one or more quantitative indicators comprise voxel classifications. In one embodiment, step c) further comprises: g) generating a voxel classification map from said first image scan data. In one embodiment, step g) further comprises: h) aggregating the voxel classification map into an overall classification of the first image scan data.

In one embodiment, the method further comprises the step of: i) identifying any blobs in a voxel classification map belonging to a predetermined voxel classification; and j) comparing said identified blobs to a predetermined threshold; and k) identifying a positive indication of a potential pathology if said predetermined threshold is exceeded.

In one embodiment, step i) comprises: l) performing one or more of: anisotropic Gaussian blob detection; isotropic Gaussian blob detection and/or ridge detection to identify said blobs.

In one embodiment, the computer system comprises a neural network algorithm. In one embodiment, the neural network algorithm comprises a convolutional neural network algorithm. In one embodiment, the neural network algorithm comprises a U-net. In one embodiment, the convolutional neural network comprises an encoding part and a decoding part. In one embodiment, the encoding part comprises a contracting path and the decoding part comprises an expansive path. In one embodiment, encoding part comprises a plurality of convolutions, each followed by a rectified linear unit and a pooling operation.

In one embodiment, the method further comprises, prior to step a): m) training the neural network algorithm to identify said quantitative indicators using a training set containing a set of medical scan tuples. In one embodiment, step m) comprises utilising associated ground truth annotations. In one embodiment, step c) is operable to blind predict said quantitative indicators of pathology and/or image quality.

In one embodiment, step c) requires no prior scan image data of said specific subject. In one embodiment, the first image acquisition sequence comprises a plurality of different scan types.

In one embodiment, the medical imaging system comprises an MRI scanner and the plurality of scan types are selected from the group of: T2 FLAIR; DWI; 3D SWI; T2* gradient echo and T1 TSE.

In one embodiment, step b) comprises performing a first image scan of a first type followed by a second image scan of a second type. In one embodiment, step c) is carried out on image scan data from said first image scan whilst the second image scan is taking place.

In one embodiment, quantitative indicators provide an indication of one or more of the following potential pathologies: Tumour (general); Glioma; Granuloma; Abscess; Haemorrhage; Microhaemorrhage; Infarct; Ischemic changes; Demyelination; Neoplasm; neurodegenerative disease and Hydrocephalus.

In one embodiment, step d) further comprises: m) based on said identification of one or more of said quantitative indicators of pathology at step c), determining, using the computer system, whether a notification should be generated and, if so determined the method further comprises; n) generating a notification corresponding to the identified quantitative indicators during the scan session.

In one embodiment, step d) further comprises: m) based on said identification of one or more of said quantitative indicators of pathology at step c), determining, using the computer system, whether a notification should be generated and, if so determined the method further comprises; n) generating, during the medical scan session, a notification relating to the probable pathology associated with said identified quantitative indicators.

In one embodiment, the notification is provided to an operator of the medical imaging system and/or a medical professional during the medical scan session. In one embodiment, the notification is indicative of the probable need for urgent treatment of the subject.

In one embodiment, the one or more quantitative indicators identified in step c) provide an indication of one or more of: Haemorrhage; Microhaemorrhage; or infarct; and the urgent treatment relates to stroke. In one embodiment, the notification is indicative of the probable need for: thrombolytic treatment; blood thinning medication; or treatment avoiding blood thinning medication.

In one embodiment, step m) comprises: o) correlating one or more values of said one or more identified quantitative indicators with values of said one or more identified quantitative indicators associated with normal healthy subjects and/or with values associated with a known pathology.

According to a second aspect of the present invention, there is provided a method of performing a medical scan of a subject using a medical imaging system, the method comprising: a) initiating a medical scan session; b) performing, using the medical imaging system, an image acquisition sequence during the medical scan session to obtain image scan data; c) performing, using a computer system, image analysis on the image scan data acquired during said image acquisition sequence to identify one or more quantitative indicators of pathology; d) based on said identification of one or more of said quantitative indicators of pathology at step c), determining, using the computer system, whether a notification should be generated and, if so determined, the method further comprises: e) generating, during the medical scan session, a notification relating to the probable pathology associated with said identified quantitative indicators.

In one embodiment, the notification is provided to an operator of the medical imaging system and/or a medical professional during the medical scan session. In one embodiment, the notification is indicative of the probable need for urgent treatment of the subject.

In one embodiment, the one or more quantitative indicators identified in step c) provide an indication of one or more of: Haemorrhage; Microhaemorrhage; or infarct; and the urgent treatment relates to stroke. In one embodiment, the notification is indicative of the probable need for: thrombolytic treatment; blood thinning medication; or treatment avoiding blood thinning medication.

In one embodiment, step c) further comprises: f) performing, using a computer system, image analysis on the image scan data acquired during said image acquisition sequence to identify one or more quantitative indicators of image quality.

In one embodiment, step d) further comprises g) based on said identification of one or more quantitative indicators at step c), determining, using the computer system, whether any additional image acquisition sequences are required during said medical scan session; and, if so required: h) determining, using the computer system, a second image acquisition sequence based on the one or more quantitative indicators; and i) performing, using the medical imaging system, a second image acquisition sequence during the medical scan session to obtain second image scan data.

In one embodiment, the first and/or second image scan data comprises two-dimensional image scan data. In one embodiment, the first and/or second image scan data comprises three-dimensional image scan data. In one embodiment, step c) is performed using a classifier and said one or more quantitative indicators comprise voxel classifications. In one embodiment, step c) further comprises: j) generating a voxel classification map from said image scan data.

In one embodiment, step g) further comprises: k) aggregating the voxel classification map into an overall classification of the image scan data.

In one embodiment, further comprising the step of: I) identifying any blobs in a voxel classification map belonging to a predetermined voxel classification; and m) comparing said identified blobs to a predetermined threshold; and n) identifying a positive indication of a potential pathology if said predetermined threshold is exceeded.

In one embodiment, the computer system comprises a neural network algorithm. In one embodiment, the neural network algorithm comprises a convolutional neural network algorithm. In one embodiment, the neural network algorithm comprises a U-net.

In one embodiment, further comprising, prior to step a): o) training the neural network algorithm to identify said quantitative indicators using a training set containing a set of medical scan tuples. In one embodiment, step o) comprises utilising associated ground truth annotations. In one embodiment, step c) is operable to blind predict said quantitative indicators of pathology and/or image quality.

In one embodiment, step c) requires no prior image scan data of said specific subject. In one embodiment, the image acquisition sequence comprises a plurality of different scan types.

In one embodiment, the medical imaging system comprises an MRI scanner and the plurality of scan types are selected from the group of: T2 FLAIR; DWI; 3D SWI; T2* gradient echo and T1 TSE.

In one embodiment, step b) comprises performing an image scan of a first type followed by a second image scan of a second type. In one embodiment, step c) is carried out on image scan data from said image scan whilst the second image scan is taking place.

In one embodiment, the medical imaging system comprises an MRI scanner and the said imaging scan data is produced by magnetic resonance imaging (MRI). In one embodiment, the medical imaging system comprises an MRI scanner and the said imaging scan data is produced by magnetic resonance imaging (MRI) using one or more techniques selected from the group of: T1-weighted and T2-weighted MRI scans; FLAIR scans; Diffusion-weighted imaging (DWI); Contrast-enhanced MRI (CE-MRI); Dynamic Contrast-Enhanced MRI (DCE-MRI); gradient echo (GRE); Susceptibility weighted imaging (SWI); and Turbo spin echo (TSE).

In one embodiment, the medical imaging system comprises a CT scanner and the said imaging scan data comprises computed tomography (CT) data. In one embodiment, the medical imaging system comprises a PET scanner and the said imaging scan data comprises PET data.

In one embodiment, steps a) to f) of the first aspect and steps a) to e) of the second aspect are all performed whilst the subject remains in the medical imaging system. In one embodiment, the (first) image scan data and/or second image scan data relates to imaging of a portion of the body of the subject. In one embodiment, the (first) image scan data and/or second image scan data relates to imaging of the brain of the subject.

In one embodiment, step c) and/or step f) further comprises performing skull stripping of the first image scan data to obtain a voxel map of brain tissue and cerebrospinal fluid. In one embodiment, said skull stripping is performed by a neural network algorithm. In one embodiment, said neural network algorithm is trained to identify and remove a skull portion of said first image scan data and/or second image scan data using a training set containing a set of image scan tuples.

According to a third aspect of the present invention, there is provided a computer system comprising a processing device configured to perform the method of the first aspect or the second aspect.

According to a fourth aspect of the present invention, there is provided a computer readable medium comprising instructions configured when executed to perform the method of the first aspect or the second aspect.

According to a fifth aspect of the present invention, there is provided a computer system comprising: a processing device, a storage device and a computer readable medium of the third aspect.

BRIEF DESCRIPTION OF FIGURES

Embodiments of the present invention will now be described in detail with reference to the accompanying drawings, in which.

DETAILED DESCRIPTION

The present invention, in embodiments, relates to a novel, non-invasive medical imaging processing application that is intended for automatic labelling and visualisation of candidate findings from a set of magnetic resonance (MR) images. An output consists of labelling of visualisations of candidate pathologies with a quantitative indicator.

Users need to use the provided tools for validation of candidate findings. It is intended to provide a trained medical professional with complementary information for the evaluation and assessment of MR images and to aid the trained medical professional in determining the appropriate additional MR sequences for diagnosis and determining prioritized workflows. The present invention a post-processing workstation or cloud solution working on routed Digital Imaging and Communications in Medicine (DICOM) images.

The smart protocol according to an embodiment of the invention is operable to classify data acquired during a scan and provide an indication to the medical professional regarding whether any, and what, further scans are recommended. In other words, the smart protocol is a configurable item that for a given input tuple of medical scans outputs a recommended next action (for example a new scan). The configuration is context specific.

A unique feature of the present invention is that the method does not require prior knowledge of the patient's history or previous scan data. Consequently, the present invention can be utilised with patients who are being scanned for the first time or who may be investigated for medical complications different from previous scans.

The smart protocol is realised as a decision tree, and the decision at each node in this tree is automatically taken by an algorithm.

The method comprises a machine learning algorithm to identify parameters of interest in scan data. The parameters are identified by means of a training process which enables classification of specific features within images by means of one or more quantitative indicators or parameters indicative of one or more pathologies or image quality. So trained, the computing process can identify quantitative indicators or parameters indicative of specific pathologies and/or image quality during a medical scan session and recommend any additional scan sequences that may be required and/or in specific embodiments, provide quantitative indicators providing probable indication of a pathology which may require immediate diagnosis and/or treatment by a medical professional.

This is a significant improvement on known arrangements which require analysis of scan data to be performed by a medical professional after the scan session has been completed.

Figure 1:
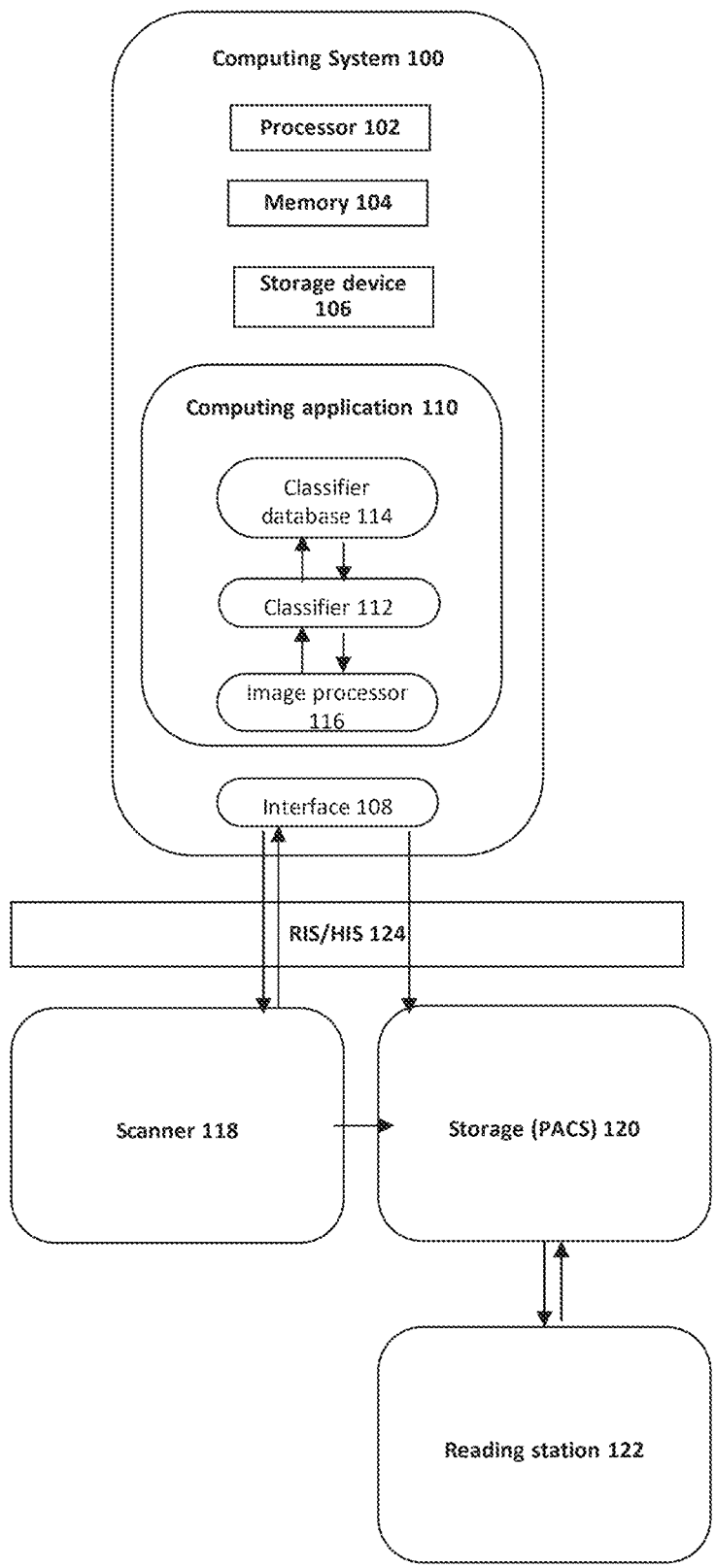
FIG. 1 illustrates a computing system 100 forming part of the present invention.

FIG. 1 illustrates a computing system 100 forming part of the present invention.

Figure 2:
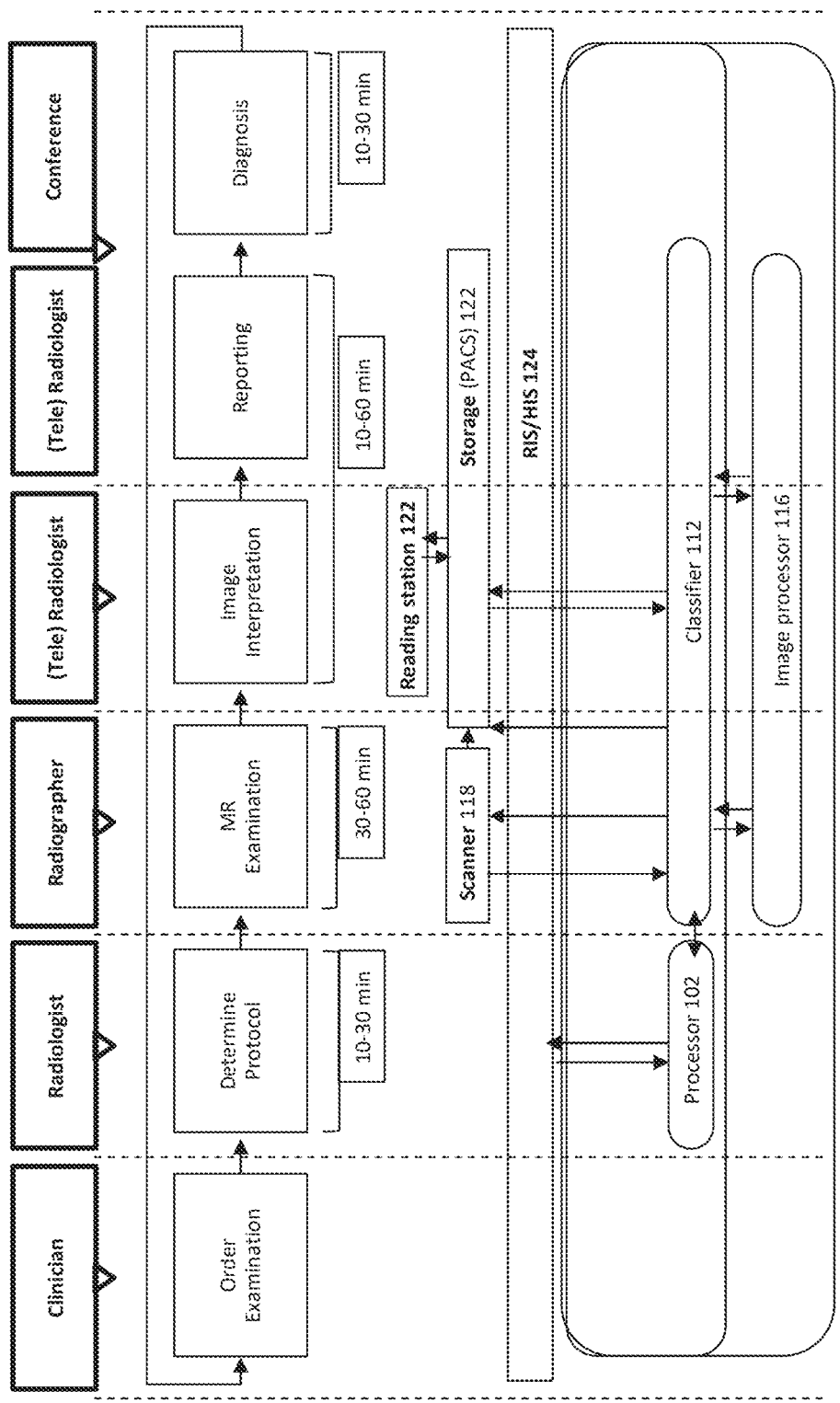
FIG. 2 illustrates the computing system 100 of FIG. 1 in the context of a scan sequence workflow process.

FIG. 2 illustrates the computing system 100 of FIG. 1 in the context of a scan sequence workflow process.

The present invention relates to a medical imaging system 10. The medical imaging system 10 comprises a computing system 100. The computing system 100 may take any suitable form and may comprise, for example, a remote computer, a cloud-based computing system, a local workstation or a medical imaging system console.

The computing system 100 comprises one or more processors 102, a computer-readable physical memory 104 and a non-transitory storage device 106 such as a hard disk drive or solid-state drive. The non-transitory storage device 106 may take any suitable form and may include storage device (s) local to the computing system 100 and/or storage devices external to the computing system 100. An interface 108 is provided to enable the computing system 100 to communicate with other components in the medical imaging system 10, A computing application 110 is run on the computing system and is operable to cause the computing system 100 to perform the method of the present invention.

The computing application comprises a classifier 112 and a classifier database 114 as will be described below. An image processor 116 is further operable to interact with the classifier 112 as will be described below.

The computing application 110 is operable to communicate through the interface 108 with the scanner 118, which in this embodiment takes the form of an MRI scanner. However, this is not intended to be limiting and other scanner types could be used, for example, CT or PET, or combinations thereof.

The interface 108 and scanner 118 are in data communication with a storage device 120 in the form of a picture archiving and communication system (PACS) 120. The PACS 120 is an industry standard device and format for medical imaging. However, this is not intended to be limiting and other configurations may be used. The PACS 120 is operable to handle image and other data in the Digital Imaging and Communications in Medicine (DICOM) format. However, other proprietary or non-proprietary formats may be used.

A reading station 122 is in communication with the PACS 120 and can be used by a medical practitioner to read, interpret and analyse image data.

It is noted that the computing system 100, in this embodiment, communicates through a Radiologist Information System or Hospital Information System (HIS), shown generally at 124. However, this is not material to the present invention and other systems may be used as appropriate.

A method of operation of the present invention will now be described with reference to FIGS. 3 to 6.

Overall, the present invention comprises a control and analysis method that for a given input tuple of medical scans outputs a recommended next action (for example a new scan is carried out). The configuration is context specific and is provided by the clinic to use the smart protocol. The smart protocol is realised as a decision tree, and the decision at each node in this tree is automatically taken by an algorithm.

Step 200: Provide Algorithm

The classifier 112 comprises a machine learning algorithm which, in an embodiment, utilises an aggregated voxel-wise classification from a U-Net deep learning algorithm for medical image segmentation as set out in reference [1a]. However, this is not intended to be limiting and other voxel-level classifiers could be used in its place.

The building block of deep neural networks is an artificial neuron or node. Each input has an associated weight. The sum of all weighted inputs is then passed through a nonlinear activation function f, to transform the pre-activation level of the neuron to an output. The output then serves as input to a node in the next layer.

Several activation functions are available, which differ with respect to how they map a pre-activation level to an output value. The most commonly activation functions used are the rectifier function (where neurons that use it are called rectified linear unit (ReLU)), the hyperbolic tangent function, the sigmoid function and the softmax function.

The latter is commonly used in the output layer as it can compute the probability of multiclass labels. For each mode j in the first hidden layer, a nonlinear function is applied to the weighted sum of the inputs. The result of this transformation serves as input for the second hidden layer. The information is propagated through the network up to the output layer, where the softmax function yields the probability of a given observation belonging to each class.

Typically, convolutional networks are utilised for classification tasks, where the output to an image is a single class label. However, in many visual tasks, especially in biomedical image processing, the desired output should include localisation, i.e., a class label assigned to each voxel.

Figure 3:
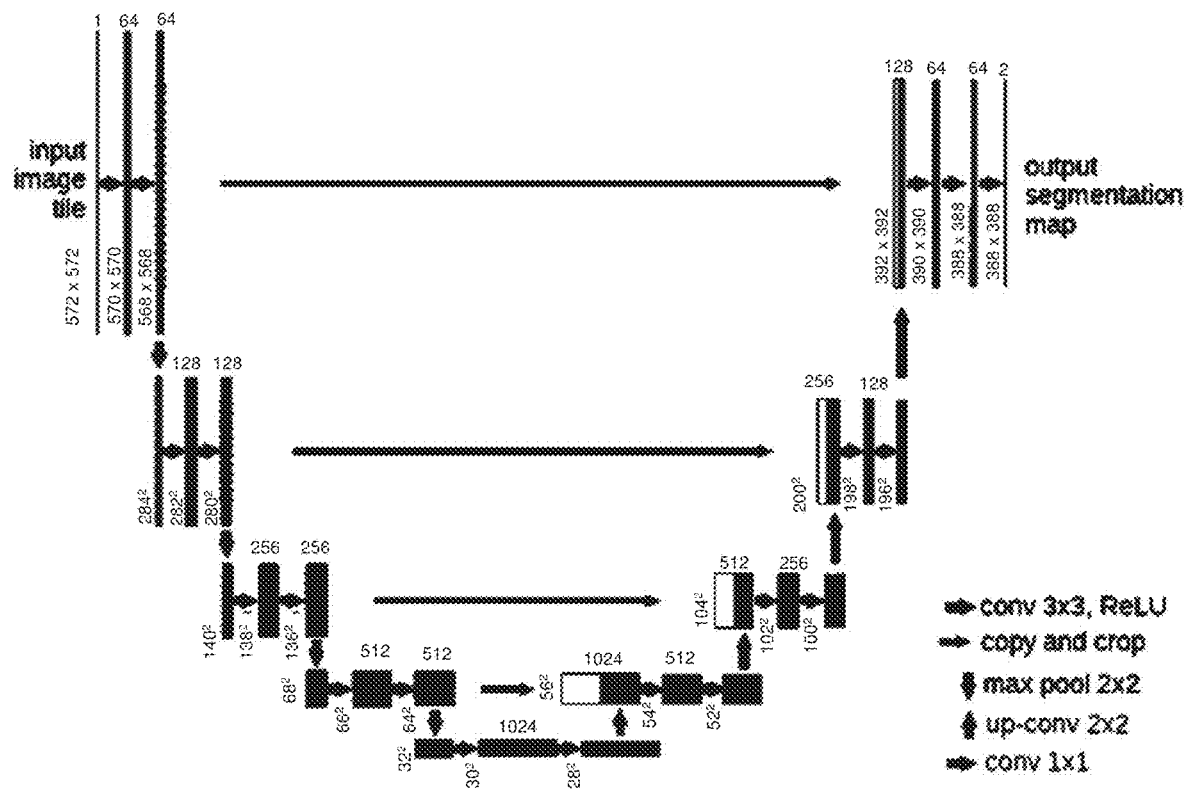
FIG. 3 shows a schematic arrangement of a U-net neural network.

In an exemplary embodiment, the network architecture of a U-net algorithm is shown in FIG. 3 and is taken from reference [1a]. The algorithm corresponds to a convolutional neural network (CNN) and comprises an encoding part and a decoding part.

The encoding side comprises a contracting path (shown on the left side) and the decoding part comprises an expansive path (shown on the right side).

The contracting path follows a typical architecture of a convolutional network and consists of the repeated application of two 3×3 convolutions, each followed by a rectified linear unit (ReLU) and a 2×2 max pooling operation with stride 2 for down-sampling.

At each down-sampling step the number of feature channels is doubled. Every step in the expansive path consists of an up-sampling of the feature map followed by a 2×2 convolution ("up-convolution") that halves the number of feature channels, a concatenation with the correspondingly cropped feature map from the contracting path, and two 3×3 convolutions, each followed by a ReLU.

In embodiments, if a CNN using a U-net algorithm is utilised as a classifier 112, this may comprise different forms. For example, a conventional 3D U-net may be used with different parameters from the examples described above. Any suitable number and size of convolutions may be utilised, having any suitable kernel size and stride size. For example, a stride of 1 may be used.

The ReLUs may comprise, in non-limiting examples: softplus approximations; noisy ReLUs (comprising Gaussian noise); leaky ReLUs (which allow a small, positive gradient when the ReLU is not active); parametric ReLUs (where the leakage coefficient within the leaky ReLU is a learned parameter of the network); and/or exponential Linear Units (ELUs).

Finally, the pooling layer may utilise max pooling with any suitable filter and stride size.

Alternatives to a conventional U-net algorithm may be used. For example, a variational autoencoder (VAE) may additionally be utilised. Examples of VAEs are described in reference [1b].

As a further alternative, a cascade U-net VAE may be used in which two sets of U-net VAE models are interlinked such that the output of the first U-net is concatenated to the input image and fed into the second U-net. Examples can be found in reference [1c].

Step 202: Train Algorithm

In the context of a deep machine learning neural net solution, classification involves two main steps. In the first step, a training phase, a subset of the available data known as the training set is used to optimise the network's parameters to perform the desired task (classification). The model may be trained from scratch without any pre-training.

In the second step, the so-called testing phase, the remainder subset which is known as the test set is used to assess whether the trained model can blind-predict the class of new observations. When the amount of available data is limited, it is also possible to run the training and testing phases several times on different training and test splits of the original data and then estimate the average performance of the model—an approach known as cross-validation.

The algorithm of the present invention is trained using a training set containing a set of medical scan tuples with associated ground truth annotations, to classify each voxel in the medical scan into one of several candidate classes. These may be from any suitable image acquisition technique or method.

A plurality of input images is utilised which form a training set containing a set of medical scan tuples with associated ground truth annotations to classify each voxel in the medical scan into one of several candidate classes.

The data may be pre-processed. For example, the input images may be resampled to achieve an isotropic voxel size. To address problems such as infarct segmentation, a diffusion sequence may be resampled such that the images are, firstly, isotropic and then the fluid attenuated inversion recovery (FLAIR) and/or susceptibility weighted imaging (SWI) sequences may be reformatted to the resampled diffusion space. An apparent diffusion coefficient can then be computed.

In a similar fashion, for the problem of haemorrhage segmentation, an SWI space may be used. After resampling, the images may be z-normalized and fed into the neural network for training and inference. The data may be cropped to the region of non-zero values after the resampling using, for example, Otsu median filtering.

The above examples are intended to be exemplary and non-limiting. The skilled person would be readily aware of other input images and/or pre-processing methods which could be used with the present invention.

In addition, the U-Net training is improved by artificial extension using data augmentation. Such data augmentation may be desirable to enable the network to be trained sufficiently where limited input images are available.

A number of transformations may be used to augment the dataset of training images. For example, input images may be extended with transformations based on a random velocity field [2]. Additionally or alternatively, a random selection of transformation (which may include no augmentation or transformation) may be used for each training step.

The input images so transformed may be weighted with a cost function having a predetermined factor to account for discrepancies and artifacts. In an embodiment, the predetermined factor is 0.75. and artifacts.

Alternative transformations may be used and these may include one or more of: rotations, elastic transformation, gaussian noise, gaussian blur, contrast, gamma correction, and mirroring. For models with a VAE branch only intensity transformation may only be used due to the image reconstruction regularization.

Finally, post-processing of images may be used to improve image classification performance. In embodiments, a morphological filtering may be used to remove random predictions in the images.

For architecture selection, blobs that are smaller than a particular size may be removed. In embodiments, blobs smaller than 5 mm³ may be removed. Other sizes may be used. For example, classification performance may be optimised by removal of blobs that are smaller than 125 mm³.

The classifier 112 is trained using the training set of images in the classifier database 114. In general the classifier 112 functions by taking the values of specific features (independent variables or predictors, in regression) in an example (the set of independent variable values) and predicts the class that that example belongs to (the dependent variable).

In the present medical imaging context, the features comprise voxels (volume pixels) and the class may be indicative of a particular probable pathology. The classifier 112 is required to learn a number of parameters from the training data in the classifier database 114. The classifier is essentially a model of the relationship between the features and the class label in the training set. More formally, given an example x, the classifier is a function f that predicts the label $\hat{y}=f(x)$.

Typically, neural networks can learn through a gradient descent-based algorithm. The gradient descent algorithm aims to find the values of the network weights that best minimise the error (difference) between the estimated and true outputs.

It should be noted that these methods are not actual classifiers themselves; instead, they are networks that are pre-trained to learn useful patterns in the data and then fed to a real classifier at the final layer.

In an exemplary embodiment, the training set of input images and corresponding segmentation maps are used to train the algorithmic network with a stochastic gradient descent method. The following is a general example of this in accordance with reference [1a].

An energy function is computed by a pixel-wise soft-max over a final feature map combined with the cross-entropy loss function. The soft-max is defined as set out in equation 1):

$$p_k(X) = \exp(a_k(X)) / \left( \sum_{k'=1}^{K} \exp(a_{k'}(X)) \right) \quad 1)$$

where $a_k(x)$ denotes the activation in feature channel k at the pixel position $x \in \Omega$ with $\Omega \subset \mathbb{Z}^2$. k is the number of classes and $p_k(x)$ is the approximated maximum-function, i.e. $p_k(x) \approx 1$ for values of k that has the maximum activation $a_k(x)$ and $p_k(x) \approx 0$ for all other k. The cross entropy then penalises at each position the deviation of $p(x)(x)$ from 1 as per 2) below:

$$E = \sum_{x \in \Omega} w(x) \log(P_{l(x)}(x)) \quad 2)$$

where $l: \Omega \to \{1, \ldots, K\}$ is the true label of each pixel and $\Omega \to \mathbb{R}$ is a weight map that is introduced to give some pixels more importance in the training.

A weight map is pre-computed for each ground truth segmentation to compensate for the different frequency of pixels from a certain class in the training data set, and to force the network to learn the small separation borders that are introduce between adjacent test cells.

The weight map is then computed as per equation 3):

$$w(x) = w_c(x) + w_0 \cdot \exp\left(-\frac{(d_1(x) + d_2(x))^2}{2\sigma^2}\right) \quad 3)$$

where $w_c: \Omega \to \mathbb{R}$ is the weight map to balance the class frequencies, $d_1: \Omega \to \mathbb{R}$ denotes the distance to the border of the nearest cell, and $d_2: \Omega \to \mathbb{R}$ the distance to the border of the second nearest cell.

In deep networks with many convolutional layers and different paths through the network, it is important to initialise the weights correctly, otherwise parts of the network might give excessive activations, while other parts never contribute. Ideally, the initial weights should be adapted such that each feature map in the network has approximately unit variance.

For a network with alternating convolution and ReLU layers, this can be achieved by drawing the initial weights from a Gaussian distribution with a standard deviation of $\sqrt{2/N}$, where N denotes the number of incoming nodes of one neuron. For example, for a 3×3 convolution and 64 feature channels in the previous layer N=9.64=576.

However, alternative approaches may be used. In an embodiment, the U-net or similar neural network is trained using dice as the loss function. In an example, a kernel weight regularisation of 1e−6 may be used on all layers.

A dice loss function functionally similar to reference [1d] may be used and is formulated As set out in equation 4):

$$\mathcal{L}_{dc} = -\frac{2}{|K|} \sum_{k \in K} \frac{\sum_{i \in I} u_i^k v_i^k}{\sum_{i \in I} u_i^k + \sum_{i \in I} v_i^k} \quad 4)$$

where u is the predicted segmentation, v is the ground truth, and K is the number of classes.

Both predicted segmentation and ground truth are one-hot encoded. Sigmoid is used as the activation function. In an embodiment, optimisation may be achieved through use of an adaptive learning rate approach such as adaptive moment estimation or Adam. The Adam process utilises estimations of first and second moments of a gradient to adapt the learning rate for each weight of the neural network.

In an embodiment, the Adam methodology is utilised with a learning rate of 1e⁻¹ as the optimiser. In embodiments, the model may be trained for 100 epochs, where one epoch comprises 750 steps.

In non-limiting embodiments, a learning rate scheduler may be used to decrease the learning rate by 5% if there is no increase in the validation dice for the previous 10 epochs. The epoch with the best overall validation dice may then be used to infer finally.

A validation dice score then consists of two scores: a) an overall dice for the foreground, and b) dice only on images with foreground. A mean of these two dice scores constitute the overall dice.

Whilst other methods may be used and such a configuration is non-limiting, such a combination has the advantage of the presence of a large set of non-foreground images with diffused pathology which may lead to a high number of false positives.

Step 204: Test Algorithm

Once trained, the classifier can then be used to determine whether the features used contain information about the class of the example. This relationship is tested by using the learned classifier on a different set of the test data.

In the present embodiment, identification of infarcts in brain MRI were carried out based on tuples of T2-weighted fluid attenuation inversion recovery (FLAIR), diffusion weighted imaging (DWI), and susceptibility weighted angiography (SWAN) or gradient echo (GRE) MRI sequences.

The classifier 112 was trained using manually annotated findings in the medical scans, annotated by in-house radiographers. The medical scans were annotated by consulting already existing clinical reports with radiological findings, and annotating the voxels corresponding to these findings in the scans.

The technical feasibility of the classifier 112 was investigated by computing DICE overlap with annotations done by the same in-house radiographers on medical scans not part of the training set.

The clinical feasibility of the classifier 112 was investigated by computing the per-finding (one-vs-rest) sensitivity and specificity at subject level for known radiological findings according to clinical report. The clinical feasibility illustrates the capability of the classifier 112 as a decision algorithm for use in the present method.

The classifier 112 was trained on 29 subjects (16 with infarcts and 13 with hemorrhages). The trained classifier 112 as technically evaluated using 4 independent subjects with infarcts, and it was clinically evaluated using 80 independent subjects (60 with infarcts and 20 with no findings). The results are shown in Table 1 below.

TABLE 1

|  | DICE |
| --- | --- |
| Infarct | 0.7603 |
| Background | 0.9983 |
| No finding | |

Figure 4:
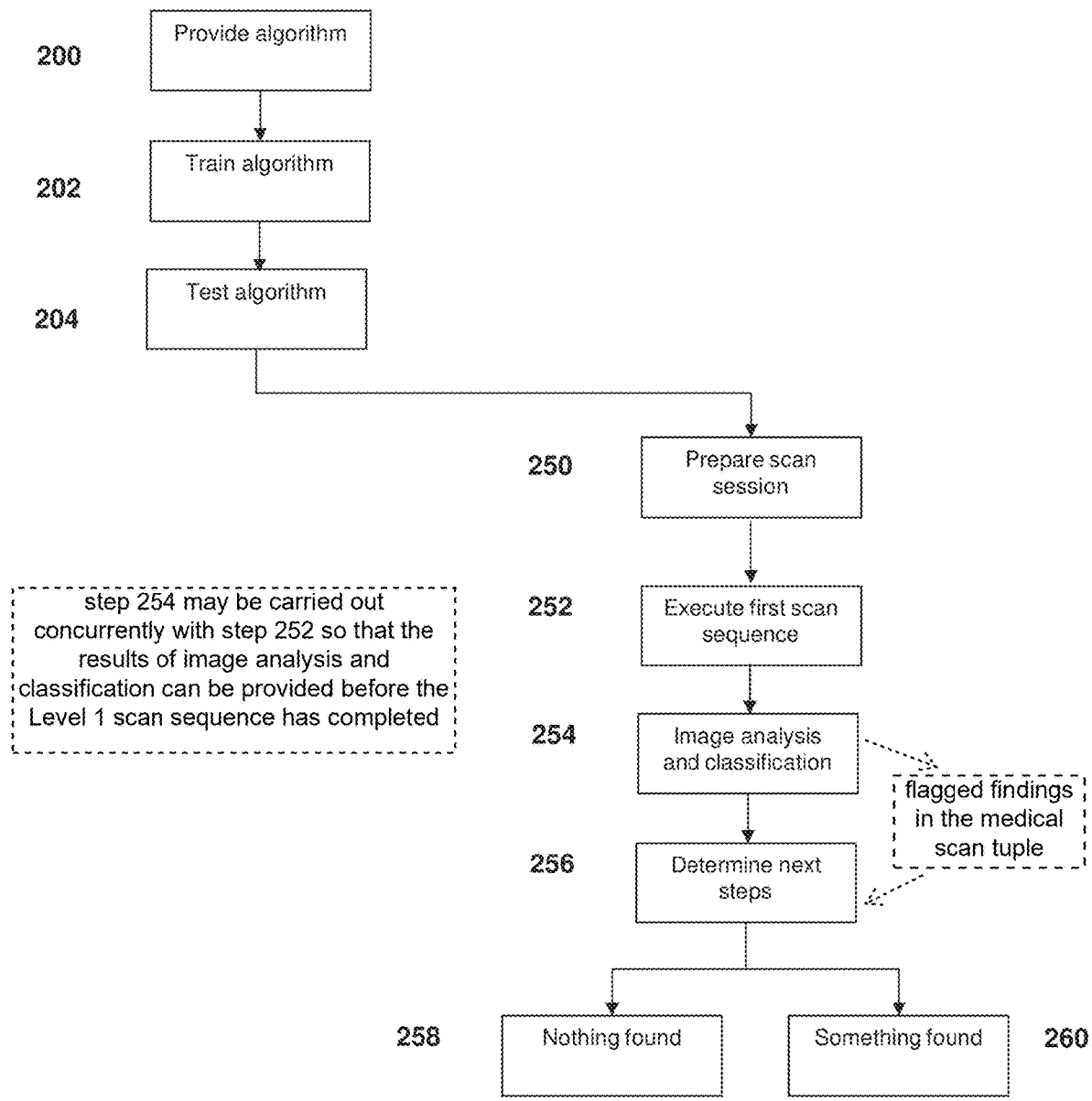
FIG. 4 shows a flow chart of the method of the present invention.

Once the algorithm forming the classifier 114 has been tested sufficiently, the classifier 112 can be utilised as part of an assisted automated scan session as described below with reference to FIGS. 4 to 6.

Step 250: Prepare Scan Session

At step 250, the scanner is prepared for the scan. This may comprise determining the scan sequence and protocol that is needed for a specific portion of region of a subject's body. This may be derived automatically, or a medical practitioner may specify a particular scan sequence. In an embodiment, the computing application 110 may, based on the initial input for the scan sequence, may compute what is considered to be the most likely path through the scan sequences that may be needed for a particular patient. This may also be informed by other data, such as empirical data. For example, semantic or natural language analysis of patient records, empirical knowledge of the most common pathologies for a given body part, or other data could be used to inform an initial "best guess". This acts as a placeholder for subsequent analysis or further scan sequences.

The following exemplary embodiments refer to scans of the brain. However, this is not intended to be limiting and in principle any suitable body part or region of the body could be scanned using the described method.

Step 252: Execute First Scan Sequence

At step 252, the first scan sequence is executed. In this embodiment, the first scan sequence comprises a plurality of different image acquisition sequences which form part of the first or Level 1 scan sequence. It is noted that the following order of sequences shown and described in this embodiment may be varied as appropriate and different orders, or different scan techniques, may be used as appropriate.

In this embodiment, the first scan sequence comprises the following techniques:

T2 FLAIR
DWI
3D SWI
T1 TSE

These techniques are selected so as to provide a coarse indicator of the following potential pathologies:

Tumour (general)
Glioma (most prevalent type of tumour)
Granuloma
Abscess
Haemorrhage
Microhaemorrhage
Infarct
Ischemic changes
Demyelination
Neoplasm
Hydrocephalus The order of the acquired sequences can be determined based on importance. For example, if T2 FLAIR and SWI is acquired in 3D, the reformatted FLAIR can be used to assess aqueductal stenosis related to hydrocephalus and SWI can be used to assess both calcifications and haemorrhages/haemosedirin (iron). No other sequences are therefore needed for a coarse indicator of the potential pathologies listed above.

Figure 5:
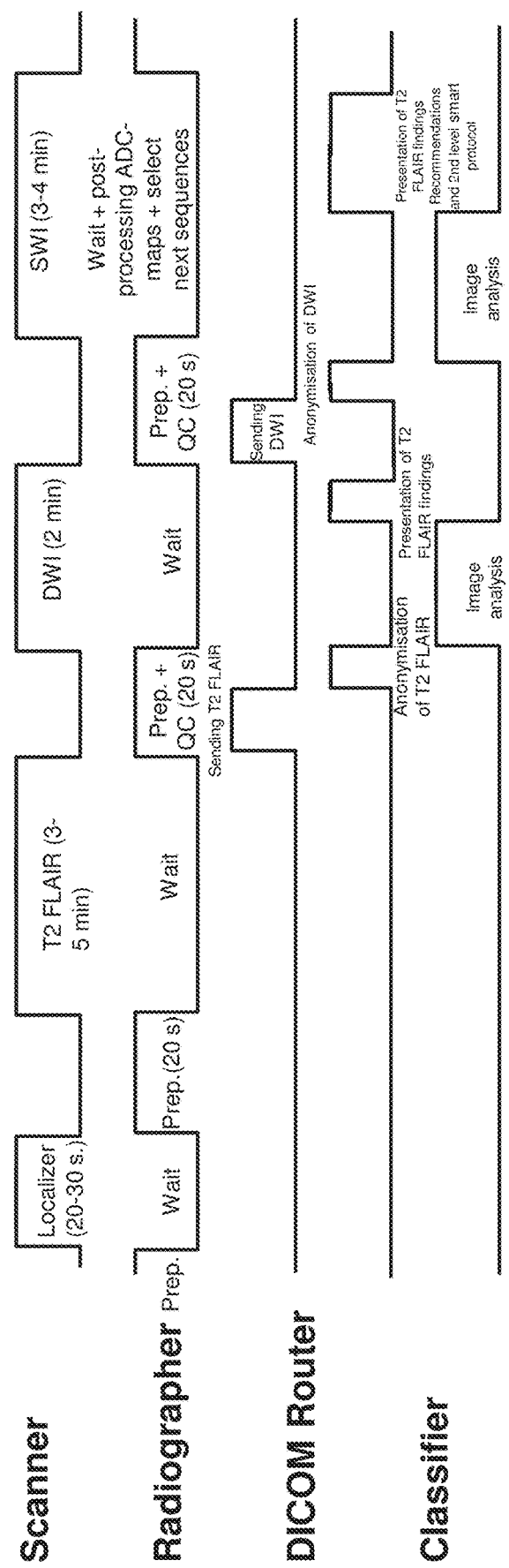
FIG. 5 shows a schematic workflow of a Level 1 scan acquisition process.

FIG. 5 shows a flow diagram of the temporal sequence of image acquisitions during the level 1 scan sequence. As shown, initially a localiser is utilised for 20 to 30 seconds. Then, the T2 FLAIR scan acquisition is carried out, with this process taking approximately 3 to 5 minutes. The data so acquired is sent via a DICOM router from the scanner 118 to the computing system 100 via the interface 108.

The next scan acquisition is a DWI scan process which last for approximately 2 minutes. Concurrently with this scan, image processing is carried out by the image processor 116 and classification using the classifier 112 also occurs. This will be described in the next step although temporally steps 252 and 254 may occur simultaneously or at least in part concurrently. Usefully, the scan interpretation data from the T2 FLAIR process may be obtained prior to the end of the DWI sequence.

Once this scan is complete, the data is sent via the DICOM router to the image processor 116 and classifier 112 for processing and identification of potential pathologies.

The next stage in the Level 1 scan acquisition according to this embodiment is the determination of a SWI scan. This typically takes around 3-4 minutes. If required, a further scan in the form of a T1 TSE (not shown in the timeline figure) may also be carried out.

It is noted that for each scan acquisition image scan data is obtained. This may comprise any suitable form; for example, the scan data may comprise image data of a single image, multiple images, or a combination of image data and metadata. The image scan data may comprise two-dimensional images (either obtained directly as two-dimensional images or as two-dimensional images obtained from three-dimensional data) or three-dimensional images. Alternatively, the image scan data may comprise data and metadata which is not directly image related but is utilised in forming an image of a body part of the subject.

Step 254: Image Analysis and Classification

As noted in step 252, step 254 may be carried out concurrently with step 252 so that the results of image analysis and classification can be provided before the Level 1 scan sequence has completed. This enables the transition between Level 1 and Level 2 to be effectively seamless.

As noted above, the U-net algorithm of the classifier 112 is trained to classify each voxel in a medical scan into one of several candidate classes.

When executing the Level 1 scan sequence, the classifier 112 and image processor 116 take as an input all the medical scans in each measurement as a tuple and produce a voxel classification map as an output. The method may include voxel classification steps with region-of-interest analysis and feature selection for each structure.

In this example, once the T2 FLAIR dataset tuples are obtained at step 252, processing is done on these datasets to produce a voxel classification map. The voxel classification map is then aggregated into an overall classification of the medical scan tuple (i.e. the presence of one or several findings or no findings present). This is achieved by processing the voxel classification map for each type of finding, and if a candidate finding is identified, the tuple is flagged as having this finding present.

The processing uses the connected components algorithm to identify blobs (or defects) belonging to a certain class, and if the smallest identified blob is above a threshold, it is considered a positive finding and the tuple is flagged. The finding-specific threshold is pre-determined as part of building a specific protocol and may be determined as required.

The defects may be analysed in numerous ways. For example, feature detection can be used on the voxel classification map to identify defects indicative of specific pathologies. In addition, defects relating to image quality issues may also be characterised and flagged.

Alternatively, in embodiments, this comprises performing anisotropic Gaussian blob detection as described in the exemplary embodiment above. Further alternative methods may be used. For example, isotropic Gaussian blob detection and/or ridge detection could be applied on the voxel classification map to identify defects indicative of specific pathologies flagged in the training process.

Step 256: Determine Next Step

Based on flagged findings in the medical scan tuple in step 254, it is determined whether any further sequences are required. Alternatively or additionally, it is determined whether any potential pathologies identified via the analysis at step 254 may require immediate diagnosis and/or treatment by a medical professional. If the latter case applies, the next steps may include providing a notification of the probable pathologies identified so that diagnosis and/or treatment by a medical professional can proceed on an urgent basis during the scan session as will be described below in step 260.

The next step to be selected is dependent upon the potential pathology indicated by the analysis at step 254. A non-exhaustive list of pathologies and potential indicators to those pathologies which can be flagged by the present invention is set out below:

1) Tumour: T2 FLAIR: Usually hyper intense; T1: Usually hypo intense; Diffusion: Restriction in solid portion; GRE: Hypo intense if haemorrhage; GD Enhancement: Solid portion usually
2) Granuloma: T2 FLAIR: Hypointense (tuberculoma); T2 FLAIR: eccentric nodule (NCC-neuro cystycircus cyst) Diffusion: +/−; GRE: Hypointense if calcified; GD Enhancement: Peripheral
3) Abscess: T2 FLAIR: Hypo intense; T1: Hypo isointense; Diffusion: Central restriction; GD Enhancement: Peripheral thick
4) Infarct

|  | Hyperacute | Acute | Subacute | Chronic |
| --- | --- | --- | --- | --- |
| T2/FLAIR | − | Hyperintense (acute 12-24 hrs) | Hyper | Hyper |
| T1 | − | Hypointense | Hypointense | Hypointense |
| Diffusion | Restricted | Restricted | No restriction | Facilitated (bright on both DWI & ADC) |
| GRE | − | +/− | +/− | +/− |

5) Ischemic Changes: T2 FLAIR: Hyperintense; 1: Hypo-isointense; GRE: Microhemorrhages may be associated.
6) Demyelination: T2 FLAIR: Hyperintense; T1: Hypo-isointense; Diffusion: restriction +/−GRE:−GD Enhancement: Rim/solid plaque like/broken ring.
7) Hydrocephalus: T2 FLAIR: Periventricular confluent hyperintensities+/−; T1: +/−Diffusion:−; GRE:−GD Enhancement: Leptomeningeal enhancement+/−
8) Haemorrhage

|  | HYPERACUTE | ACUTE | SUBACUTE | CHRONIC |
| --- | --- | --- | --- | --- |
| T2 | HYPOINTENSE | HYPERINTENSE | HYPERINTENSE | HYPERINTENSE |
| FLAIR | HYPOINTENSE | HYPERINTENSE | HYPERINTENSE | HYPERINTENSE |
| T1 | ISOINTENSE | HYPERINTENSE | HYPERINTENSE | HYPOINTENSE |
| Diffusion | restriction +/− | +/− | − | − |
| GRE | +/− | HYPOINTENSE | HYPOINTENSE | HYPOINTENSE |

9) Micro-Haemorrhage: T2 FLAIR:-T1:-Diffusion: +/−GRE: YES (BETTER ON 3D GRE) Based on the above and said indications derived from the analysis in the Level 1 scan acquisition process, the next steps can be determined.

As noted above, based on the Level 1 scan acquisitions, T2 FLAIR and DWI provide a coarse indicator of the presence of 8/10 pathologies (except haemorrhages and micro-haemorrhages).

At step 256, steps are taken to determine what, if any, subsequent sequences are required with or without contrast enhancement. If nothing is found T2 or SWI is acquired to approximate a 10/10 diagnosis of pathologies.

If quantitative indicators indicative of infarcts, micro-haemorrhages and/or haemorrhages in the brain are determined, then the next step may include notifying a medical professional of the probable pathologies identified so that diagnosis and/or treatment can proceed on an urgent basis during the scan session as will be described below in step 260.

There are two possible outcomes from this step: nothing found or something found as described below.

Step 258: Nothing Found

If no indicator of potential a pathology is determined at step 256, the process may terminate. However, optionally, based on natural language analysis of the clinical referral, the computing application 110 may suggest to end the examination or may continue with additional sequences based on severity.

Step 260: Something Found

If a positive indication of a potential pathology is identified at step 256, then, based on the learning algorithm, the computing application 110 may suggest what other actions to take in order to refine and substantiate additional image material necessary to enable a medical practitioner to arrive at a diagnosis.

Figure 6:
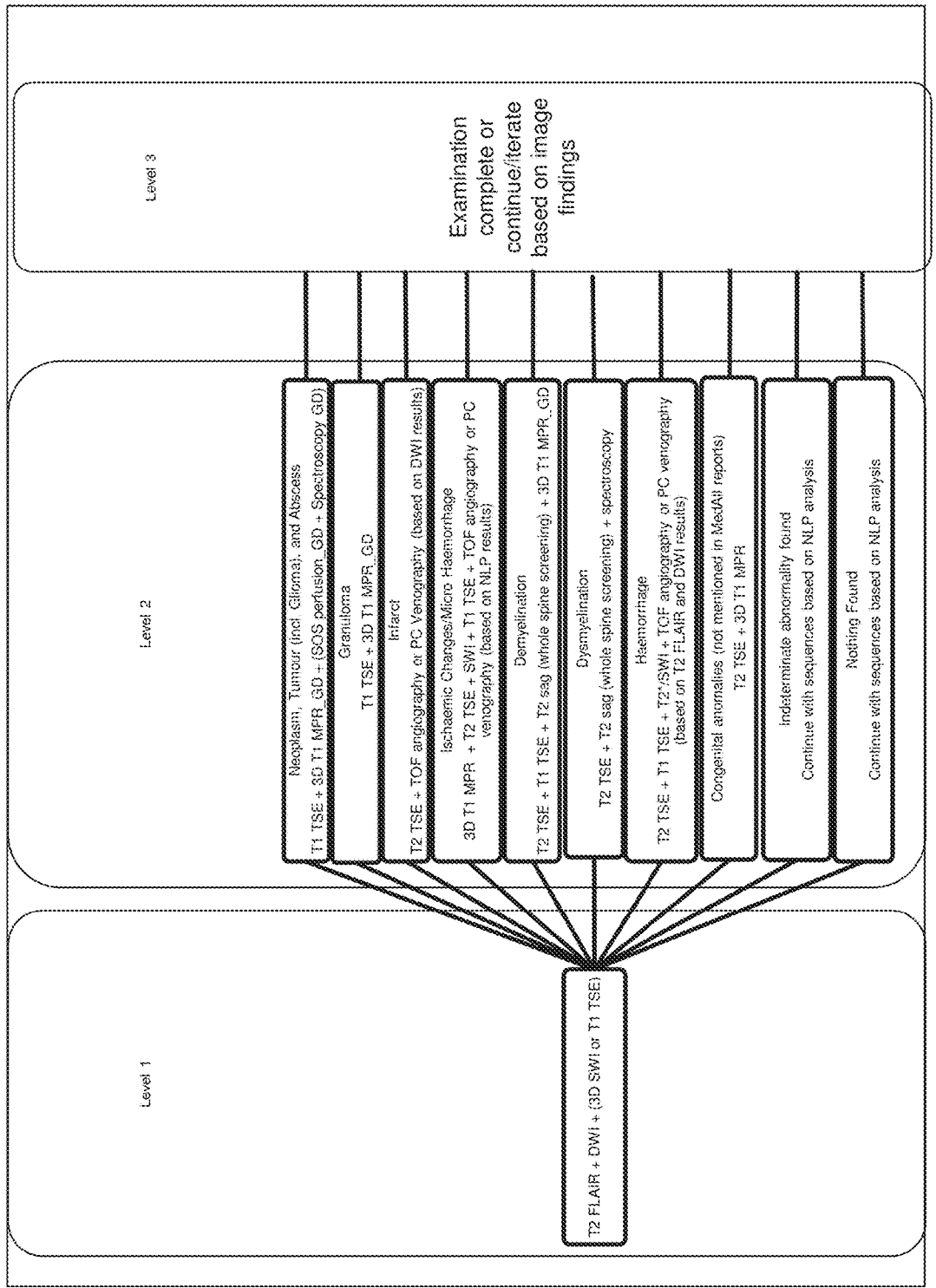
FIG. 6 shows a schematic view of the scan acquisition process including the Level 2 and subsequent scan acquisition.

A list of potential next sequences is shown in FIG. 6. Listed briefly, the following sequences have been derived as further tests at Level 2 for the pathologies identified above. As shown in FIG. 6, the available sequences are:

Neoplasm, Tumour (incl. Glioma), and Abscess: T1 TSE+3D T1 MPR_GD+(SOS perfusion_GD+Spectroscopy GD)
Granuloma: T1 TSE+3D T1 MPR_GD
Infarct: T2 TSE+TOF angiography or PC Venography (based on DWI results)
Ischaemic Changes/Micro Haemorrhage: 3D T1 MPR+T2 TSE+SWI+T1 TSE+TOF angiography or PC venography (based on NLP results)
Demyelination: T2 TSE+T1 TSE+T2 sag (whole spine screening)+3D T1 MPR_GD
Dysmyelination: T2 TSE+T2 sag (whole spine screening)+spectroscopy
Haemorrhage: T2 TSE+T1 TSE+T2*/SWI+TOF angiography or PC venography (based on T2 FLAIR and DWI results)
Congenital anomalies (not mentioned in Medical reports): T2 TSE+3D T1 MPR
Indeterminate abnormality found: Continue with sequences based on NLP analysis Once the Level 2 scans have been completed, the process proceeds to Level 3. At Level 3, the process ends unless some additional other pathology identified in the Level 2 scan, in which case further scans may take place.

In addition, if a positive indication of a probable pathology is identified at step 256, then, based on the learning algorithm, the computing application 110 may suggest additional or alternative actions to further scans.

For example, if a positive indication of a probable pathology is identified at step 256, then a notification may be provided during the medical scan session. In other words, a notification relating to, corresponding to, or indicative of the probable pathology may be indicated whilst the subject is still in the scanner 118 during the medical scan session.

The notification may be provided in any suitable way. For example, it may be provided as an audible signal, or it may be provided on a display or on multiple displays. The notification may be provided to a medical professional or to an operator of the medical imaging system 10.

In embodiments, the notification may be indicative of the probable need for urgent treatment of the subject. The notification may therefore provide an indication or information to a medical professional or operator which the medical professional or operator can then use to make a suitable diagnosis regarding whether urgent treatment of the subject is needed whilst the subject is in scanner 118.

In embodiments, the one or more quantitative indicators may provide an indication of one or more of: Haemorrhage; Microhaemorrhage; or infarct, in which case a suitable notification may indicate to a medical professional the probable presence of stroke in the subject and the medical professional can then make a diagnosis of the condition and the treatment required.

In embodiments, the notification may be indicative of the probable need for: thrombolytic treatment; blood thinning medication; or treatment avoiding blood thinning medication. By providing an indication of the probable need for such treatments, the present invention provides a notification which alerts and facilitates a medical practitioner to make a fast diagnosis and corresponding appropriate treatment of a subject still in the scanner 118.

Combinations of the above notification and recommendations for subsequent scans may be used and would be readily contemplated by the skilled person.

Experimental Examples

Example 1

In Example 1, different encoder-decoder architectures suitable for use with the method of the present invention are evaluated which attempt to use one set of hyper-parameters across two different tasks of medical image segmentation: a) Stroke lesion segmentation, and b) Haemorrhage segmentation.

Example 1: Data

A total of 997 subjects were considered for this study. All the studies had the following sequences: fluid attenuation inversion recovery sequence (FLAIR: mean shape (512; 512; 20), and mean voxel size (0.46 mm; 0.46 mm; 7 mm)), diffusion weighted image sequence (DWI: mean shape (256; 256; 20), and mean voxel size (1.05 mm; 1.05 mm; 7 mm)), and either a susceptibility weight imaging sequence (SWI) or a T2* gradient echo sequence (GRE) (SWI/GRE: mean shape (512; 512; 72), and mean voxel size (0.46 mm; 0.46 mm; 2 mm)).

In the first dataset (dataset-A) there are 156 cases with infarcts, 67 cases with haemorrhages, and the rest are a mix of normal cases and cases with other pathologies (20% is set aside for performance evaluation). Dataset-A is used for model selection. Once an architecture is chosen, another dataset (with the same demographics) is used to train and evaluate the multiclass version of the chosen architecture. The second dataset (dataset-B) has a total of 773 cases (125 cases with tumour, 135 haemorrhages, 189 haemorrhages). Among which 98 cases are set aside for validation and reporting the classification performance. There are three models considered in this example. All the models have the same base network of a U-net as described above. Additional modifications are made to the models as follows:

Example 1-1

A 3D U-Net has an encoder-decoder structure with skip connections between matching scales of encoder and decoder. Two convolution layers (12 filters each) with a dropout (0.25 rate) in between the input and the U-Net are used. Each scale in an encoder represents a max-pooling layer of size 2, and in the decoder represents an up-sampling layer. Trilinear interpolation is used for up-sampling.

In between two scales, two convolution layers followed by an instance normalisation layer is used. Each convolution layer is equipped with a leaky ReLU (negative slope $1e^{-2}$). A patch size of 192×192×192 is used. 12 filters are used in the first layer followed by 24, 48, and 56 filters in the encoder. Similar numbers of filters are used in the decoder but in reverse order.

All convolutions are performed with a kernel size of 3 and stride 1. In the end, a sigmoid activation function is used to convert the logits into probabilities of belonging to foreground and background.

Example 1-2 U-Net VAE

In this model, corresponding broadly to that disclosed in reference [1b], is a variational autoencoder (VAE) which is used to regularize the latent space. The VAE branch starts from the last layer of the encoder. The first layer of the encoder generates mean and standard deviation of a normal distribution from which a 32-dimensional vector is sampled. The vector is then used to reconstruct the input. The sampled vector layer is then connected to a layer of size matching the last layer of the encoder. Following which four convolution layers with kernel size 1 and four up-sampling (factor 2) layers are used to reconstruct the input.

Example 1-3-Cascade U-Net VAE

Two sets of U-Net VAE models with the same architecture as Example 1-3 are used. The output of the first U-Net is concatenated to the input image and fed into the second network.

In the first U-Net, the input images are scaled by a factor of 0.5 by a scaling layer at the input. The output layer is then scaled by 2 to match the size of the input. The networks are trained sequentially.

Note that while the second network is trained, the first network is fixed. While training the second model, only the U-Net part of the first model is used and the VAE branch is discarded since it does not have any influence on the segmentation during inference.
Selection of Network Only haemorrhage and infarct datasets were used to find the right architecture. Once a comparison between the models was made, the best architecture was then used to train a multi-class network i.e., each network has a target with multiple labels (tumour, infarct, and haemorrhage) instead of a binary label. Three such networks were trained. Each network is used to segment haemorrhages, tumours, and infarcts separately.

In other words, the model haemorrhage was used to only extract haemorrhage segmentations, even though all three segmentations can be obtained from the same network.

Training is performed as described above in relation to the dice loss function and optimisation using Adam.

Example 1: Results

The models were evaluated on two fronts: a) dice score, and b) detection capabilities using sensitivity and specificity scores. Example 1 Table 1 summarizes the results of infarct segmentation and Example 1 Table 2 summarizes the results of haemorrhage segmentation on dataset-A.

The best performing method is highlighted in bold. In both the problem statements, the baseline U-Net model is superior to the other two models.

Example 1 Tables 3,4 illustrate performance on dataset-B with a larger blob size threshold. From the evidence, it appears that the multiclass variation only helps with classification accuracy of haemorrhages (specially specificity) whereas for other problems, U-Net binary networks just perform as well.

Table 1: Summary of results for the infarct segmentation on dataset-A. Only hyperacute, acute, and subacute infarcts are considered. Sensitivity and specificity are reported only for the best performing method in terms of dice, in this case the standard U-Net Model. A blob filtering threshold of 5 $mm^3$ is applied.

TABLE 1

| | Example 1 | | | | | | | |
|---|---|---|---|---|---|---|---|---|
| Method | Overall dice | Non zero dice | TP | FP | TN | FN | Sensitivity | Specificity |
| UNet | 0.30 | 0.71 | 38 | 50 | 94 | 1 | 97% | 66% |
| UNet VAE | 0.29 | 0.64 | — | — | — | — | — | — |
| Cascade UNet VAE | 0.26 | 0.69 | — | — | — | — | — | — |

Table 2: Summary of results for haemorrhage segmentation on dataset-A. All ages of brain haemorrhages are considered. Sensitivity and specificity are reported only for the best performing method in terms of dice, in this case the standard U-Net Model. A blob filtering threshold of 5 $mm^3$ is applied.

TABLE 2

| | Example 1 | | | | | | | |
|---|---|---|---|---|---|---|---|---|
| Method | Overall dice | Non zero dice | TP | FP | TN | FN | Sensitivity | Specificity |
| UNet | 0.16 | 0.53 | 38 | 57 | 85 | 3 | 93% | 60% |
| UNet VAE | 0.13 | 0.50 | — | — | — | — | — | — |
| Cascade UNet VAE | 0.13 | 0.46 | — | — | — | — | — | — |

Table 3: Summary of results for the infarct, haemorrhage, and tumour segmentation using the binary standard U-Net on dataset-B. A blob filtering threshold of 125 $mm^3$ is applied.

TABLE 3

Example 1

| Method | Overall dice | Non zero dice | TP | FP | TN | FN | Sensitivity | Specificity |
|---|---|---|---|---|---|---|---|---|
| Infarct | 0.54 | 0.77 | 24 | 10 | 62 | 0 | 100% | 86% |
| Tumor | 0.06 | 0.66 | 7 | 62 | 29 | 0 | 100% | 32% |
| Hemorrhage | 0.12 | 0.32 | 12 | 37 | 44 | 2 | 86% | 54% |

Table 4: Summary of results for the infarct, haemorrhage, and tumour segmentation using the multiclass standard U-Net on dataset-B. A blob filtering threshold of 125 mm$^3$ is applied.

TABLE 4

Example 1

| Method | Overall dice | Non zero dice | TP | FP | TN | FN | Sensitivity | Specificity |
|---|---|---|---|---|---|---|---|---|
| Infarct | 0.41 | 0.69 | 16 | 56 | 94 | 0 | 100% | 77% |
| Tumor | 0.01 | 0.11 | 6 | 49 | 42 | 1 | 86% | 46% |
| Hemorrhage | 0.15 | 0.21 | 10 | 6 | 75 | 4 | 72% | 93% |

The experimental example represents analysis which may be seen in daily clinics. That is, the dataset comprised of all other pathologies like tumours, multiple sclerosis lesions, abscess, age related ischemic changes in addition to images with no clinically relevant abnormalities.

As shown, all model types perform well although the standard U-net model outperforms the other two methods. This is despite the cascade model has twice the number of parameters.

Example 2

In another example, two million radiology reports were automatically scanned using natural language processing for pathologies selecting 5000 brain MRI studies reflecting most predominant pathologies: infarcts (hyperacute and acute) and tumours.

Infarcts and tumour pathologies were annotated pixelwise by trained annotators under a radiologist's supervision and quality control. Two sets of MRI brain protocols were applied for clinically normal patients, patients with tumours, and patients with infarcts (and both) were established. These comprises 1) A control utilising a standard clinical protocol and 2) a smart protocol in accordance with the present invention utilising 4 base sequences and up to 2 additional specialized pathology-specific sequences.

Example 2-Results

On an independent dataset of 88 scans the turnaround time from scanning a sequence to reporting results back to the hospital system was less than 60 seconds. The specificity and sensitivity for detection was: Tumour 95% (88-99%), 78% (52-94%) and Infarcts 75% (63-85%), 100% (83-100%).

On an average, for the method in accordance 1.25 fewer sequences were acquired per patient, and an overall 0.23 specialized sequences were missed for patients with pathology.

This demonstrates the advantages of the approach of the present invention.

Embodiments of the present invention have been described with particular reference to the examples illustrated. However, it will be appreciated that variations and modifications may be made to the examples described within the scope of the present invention.

For example, in embodiments, the training of the U-Net can be improved further by using advanced data augmentation to artificially generate more training data. For example, by using an alternative PADDIT algorithm [3].

Further, for some findings (e.g. anatomical) or in case of abundant training data, the neural net algorithm/U-net can be trained directly for the overall finding by entering the medical scan tuple as input and, instead of training towards voxel-wise annotations, train directly towards the clinical finding in the tuple.

Additionally, in order to reduce the noise due to bias fields in the medical scans, bias field correction can be applied. For example, using the differential bias correction approach [4,5] towards a template, or by training a U-Net to bias correct. The latter requires proper training data and can provide a very fast bias correction method. The training set could be raw MRI scans as input and N4 (state-of-the-art bias field correction method) bias corrected scans as target. Furthermore, efficient utilisation of 3D information by use of a multi-planar U-Net [6] and/or a random projections extension [7].

Finally, the voxel-level results can be post-processed by applying skull stripping to the original medical scans to obtain a map of brain tissue and cerebrospinal fluid voxels that is used to filter out any erroneously segmented voxels outside the brain. Fast skull stripping can be obtained by training a U-Net to skull strip based on a skull stripped ground truth, for example obtained from the ROBEX algorithm [8] or manually segmented.

In aspects, the embodiments described herein relate to a method of extracting information from a digital image. However, the embodiments described herein are equally applicable as an instruction set for a computer for carrying out said method or as a suitably programmed computer.

The methods described herein are, in use, executed on a suitable computer system or device running one or more computer programs formed in software and/or hardware and operable to execute the above method. A suitable computer system will generally comprise hardware and an operating system.

The term 'computer program' is taken to mean any of (but not necessarily limited to) an application program, middleware, an operating system, firmware or device drivers or any other medium supporting executable program code.

The term 'hardware' may be taken to mean any one or more of the collection of physical elements that constitutes a computer system/device such as, but not limited to, a processor, memory device, communication ports, input/output devices. The term 'firmware' may be taken to mean any persistent memory and the program code/data stored within it, such as but not limited to, an embedded system. The term 'operating system' may taken to mean the one or more pieces, often a collection, of software that manages computer hardware and provides common services for computer programs.

The comparison step may also be conducted making use of previous measurements on datasets for which values or average values are stored in a database or memory location in such a computer. The computer may be programmed to display the results of the comparison as a read out.

The methods described herein may be embodied in one or more pieces of software and/or hardware. The software is preferably held or otherwise encoded upon a memory device such as, but not limited to, any one or more of, a hard disk drive, RAM, ROM, solid state memory or other suitable memory device or component configured to software. The methods may be realised by executing/running the software. Additionally or alternatively, the methods may be hardware encoded.

The method encoded in software or hardware is preferably executed using one or more processors. The memory and/or hardware and/or processors are preferably comprised as, at least part of, one or more servers and/or other suitable computing systems.

REFERENCES

1a. Ronneberger O., Fischer P., Brox T. (2015) "*U-Net: Convolutional Networks for Biomedical Image Segmentation*" In: Navab N., Hornegger J., In Medical Image Computing and Computer-Assisted Intervention-MICCAI 2015. Lecture Notes in Computer Science, vol 9351. Springer, Cham 1b. Myronenko, A (2018) "3*D MRI brain tumor segmentation using autoencoder regularization*", arXiv: abs/1810.11654

1c. Hongying Liu, Xiongjie Shen, Fanhua Shang, Feihang Ge, and Fei Wang, "*CU-net: Cascaded U-net with loss weighted sampling for brain tumor segmentation*, Multimodal Brain Image Analysis and Mathematical Foundations of Computational Anatomy, Pages 102 111, Cham, 2019. Springer International Publishing. ISBN 978-3-030-33226-6

1d. Fabian Isensee, Jens Petersen, Andre Klein, David Zimmerer, Paul F. Jaeger, Simon Kohl, Jakob Wasserthal, Gregor Koehler, Tobias Norajitra, Sebastian Wirkert, and Klaus H. Maier-Hein. "Nnu-net: Self-adapting framework for u-net-based medical image segmentation" ArXiv, abs/1809.10486, 2018

2. Patrice Y. Simard, Dave Steinkraus, John C. Platt (2003) Best Practices for Convolutional Neural Networks Applied to Visual Document Analysis, In Seventh International Conference on Document Analysis and Recognition 3. Mauricio Orbes-Ortega, Lauge Sørensen, Jorge Cardoso, Marc Modat, Sebastien Ourselin, Stefan Sommer, Mads Nielsen, Christian Igel, Akshay Pai (2019) PADDIT: Probabilistic Augmentation of Data using Diffeomorphic Image Transformation, In Medical Imaging 2019: Image Processing, SPIE Medical Imaging 2019.

4. Bin Zou, Akshay Pai, Lauge Sørensen, Mads Nielsen, Simultaneous registration and bilateral differential bias correction in brain MRI, in MICCAI 2014 Workshop on Intelligent Imaging: linking MR acquisition and processing, 2014

5. Bin Zou, Akshay Pai, Lauge Sørensen, Mads Nielsen, Bias Correction in Images, U.S. patent application US20170243336A1

6. Kaisar Kushibar, Sergi Valverde, Sandra González-Villa, Jose Bernal, Mariano Cabezas, Arnau Oliver, Xavier Llado, Automated sub-cortical brain structure segmentation combining spatial and deep convolutional features, Medical Image Analysis 48, 2018, 177-186.

7. Perslev, Mathias; Pai, Akshay Sadananda Uppinakudru; Igel, Christian; Dam, Erik Bjørnager (2018), Knee Segmentation by Multiplanar Deep Learning Network—with data from OAI, In 12th International Workshop on Osteoarthritis Imaging.

8. Iglesias JE, Liu CY, Thompson P, Tu Z: "Robust Brain Extraction Across Datasets and Comparison with Publicly Available Methods", IEEE Transactions on Medical Imaging, 30 (9), 2011, 1617-1634.

The invention claimed is:

1. A method of performing a medical scan using a medical imaging system, the method comprising:
a) initiating a medical scan session for a subject in the medical imaging system;
b) performing, using the medical imaging system, a first image acquisition sequence during the medical scan session to obtain first image scan data, the first image acquisition sequence comprising a plurality of different scan types, and the first image scan data comprising image scan data from each scan type of the plurality of different scan types in the first image acquisition sequence;
c) performing, using a classifier comprising a machine learning algorithm trained to classify specific features within the first image scan data and executed on a computer system, image analysis on the first image scan data acquired during said first image acquisition sequence to identify one or more quantitative indicators of pathology and/or image quality, wherein the one or more quantitative indicators of pathology comprise classifications of specific features within the first image scan data indicative of probable pathologies;
d) based on said identification of the one or more quantitative indicators at step c), determining, using the computer system, whether any additional image acquisition sequences are required during said medical scan session; and, if so required:
e) determining, using the computer system, a second image acquisition sequence based on the one or more quantitative indicators; and
f) recommending that the second image acquisition sequence is performed by the medical imaging system whilst the subject remains in the medical imaging system during the medical scan session to obtain second image scan data;
wherein the medical imaging system comprises an MRI scanner and the plurality of scan types are selected from the group consisting of: T2 Fluid Attenuated Inversion Recovery (FLAIR); diffusion-weighted imaging (DWI); Contrast-enhanced MRI (CE-MRI); Dynamic Contrast-Enhanced MRI (DCE-MRI); gradient echo (GRE); 3D susceptibility weighted imaging (SWI); T2* gradient echo and T1 turbo spin echo (TSE); T1-weighted imaging; T2-weighted imaging; and Susceptibility weighted imaging (SWI).

2. The method according to claim 1, wherein the first and/or second image scan data comprises two-dimensional image scan data and/or three-dimensional image scan data.

3. The method according to claim 1, wherein step c) requires no prior image scan data of the subject.

4. The method according to claim 1, wherein the medical imaging system comprises a magnetic resonance imaging (MRI) scanner and the first image scan data is produced by MRI.

5. The method according to claim 1, wherein the medical imaging system comprises a computed tomography (CT) scanner and the first image scan data comprises CT data or the medical imaging system comprises a positron emission tomography (PET) scanner and the first image scan data comprises PET data.

6. The method according to claim 1, wherein the one or more quantitative indicators are derived from a prior training process.

7. The method according to claim 1, wherein step f) further comprises:
performing, using the medical imaging system, the second image acquisition sequence during the medical scan session to obtain second image scan data.

8. The method according to claim 1, wherein the second image acquisition sequence comprises another plurality of scan types, wherein the other plurality of scan types are selected from the group consisting of: T2 Fluid Attenuated Inversion Recovery (FLAIR); diffusion-weighted imaging (DWI); Contrast-enhanced MRI (CE-MRI); Dynamic Contrast-Enhanced MRI (DCE-MRI); gradient echo (GRE); 3D susceptibility weighted imaging (SWI); T2* gradient echo and T1 turbo spin echo (TSE); T1-weighted imaging; T2-weighted imaging; and Susceptibility weighted imaging (SWI).

9. The method according to claim 1, wherein the machine learning algorithm comprises a neural network algorithm.

10. The method according to claim 9, further comprising, prior to step a):
training the neural network algorithm to identify the one or more quantitative indicators using a training set containing a set of medical scan tuples.

11. The method according to claim 1, wherein step b) comprises performing a first image scan of a first type among the plurality of different scan types followed by a second image scan of a second type among the plurality of different scan types.

12. The method according to claim 11, wherein step c) is carried out on image scan data from said first image scan whilst the second image scan is taking place.

13. The method according to claim 1, wherein step d) further comprises:
based on said identification of one or more of said quantitative indicators of pathology at step c), determining, using the computer system, whether a notification should be generated and, if so determined, the method further comprises:
generating, during the medical scan session, a notification relating to pathology associated with said one or more identified quantitative indicators.

14. The method according to claim 13, wherein the notification is provided to an operator of the medical imaging system and/or a medical professional during the medical scan session.

15. The method according to claim 13, wherein the notification is indicative of need for urgent treatment of the subject.

16. The method according to claim 15, wherein the one or more quantitative indicators identified in step c) provide an indication of one or more of: Haemorrhage; Microhaemorrhage; or infarct; and the urgent treatment relates to stroke.

17. The method according to claim 16, wherein the notification is indicative of need for: thrombolytic treatment; blood thinning medication; or treatment avoiding blood thinning medication.

18. A non-transitory computer readable medium comprising instructions configured when executed to perform a method comprising:
a) initiating a medical scan session for a subject in a medical imaging system;
b) performing, using the medical imaging system, a first image acquisition sequence during the medical scan session to obtain first image scan data, the first image acquisition sequence comprising a plurality of different scan types, and the first image scan data comprising image scan data from each scan type of the plurality of different scan types in the first image acquisition sequence;
c) performing, using a classifier comprising a machine learning algorithm trained to classify specific features within the first image scan data and executed on a computer system, image analysis on the first image scan data acquired during said first image acquisition sequence to identify one or more quantitative indicators of pathology and/or image quality, wherein the one or more quantitative indicators of pathology comprise classifications of specific features within the first image scan data indicative of probable pathologies;
d) based on said identification of the one or more quantitative indicators at step c), determining, using the computer system, whether any additional image acquisition sequences are required during said medical scan session; and, if so required:
e) determining, using the computer system, a second image acquisition sequence based on the one or more quantitative indicators; and
f) recommending that the second image acquisition sequence is performed by the medical imaging system whilst the subject remains in the medical imaging system during the medical scan session to obtain second image scan data;
wherein the medical imaging system comprises an MRI scanner and the plurality of scan types are selected from the group consisting of: T2 Fluid Attenuated Inversion Recovery (FLAIR); diffusion-weighted imaging (DWI); Contrast-enhanced MRI (CE-MRI); Dynamic Contrast-Enhanced MRI (DCE-MRI); gradient echo (GRE); 3D susceptibility weighted imaging (SWI); T2* gradient echo and T1 turbo spin echo (TSE); T1-weighted imaging; T2-weighted imaging; and Susceptibility weighted imaging (SWI).

19. The non-transitory computer readable medium according to claim 18, wherein the second image acquisition sequence comprises another plurality of scan types, wherein the other plurality of scan types are selected from the group consisting of: T2 Fluid Attenuated Inversion Recovery (FLAIR); diffusion-weighted imaging (DWI); Contrast-enhanced MRI (CE-MRI); Dynamic Contrast-Enhanced MRI (DCE-MRI); gradient echo (GRE); 3D susceptibility weighted imaging (SWI); T2* gradient echo and T1 turbo spin echo (TSE); T1-weighted imaging; T2-weighted imaging; and Susceptibility weighted imaging (SWI).

20. The non-transitory computer readable medium according to claim 18, wherein step f) further comprises: performing, using the medical imaging system, the second image acquisition sequence during the medical scan session to obtain second image scan data.

21. A computer system comprising: a processing device, a storage device and a computer readable medium comprising instructions configured when executed to perform a method comprising:
a) initiating a medical scan session for a subject in a medical imaging system;
b) performing, using the medical imaging system, a first image acquisition sequence during the medical scan session to obtain first image scan data, the first image acquisition sequence comprising a plurality of different scan types, and the first image scan data comprising image scan data from each scan type of the plurality of different scan types in the first image acquisition sequence;

c) performing, using a classifier comprising a machine learning algorithm trained to classify specific features within the first image scan data and executed on a computer system, image analysis on the first image scan data acquired during said first image acquisition sequence to identify one or more quantitative indicators of pathology and/or image quality, wherein the one or more quantitative indicators of pathology comprise classifications of specific features within the first image scan data indicative of probable pathologies;

d) based on said identification of the one or more quantitative indicators at step c), determining, using the computer system, whether any additional image acquisition sequences are required during said medical scan session; and, if so required:

e) determining, using the computer system, a second image acquisition sequence based on the one or more quantitative indicators; and f) recommending that the second image acquisition sequence is performed by the medical imaging system whilst the subject remains in the medical imaging system during the medical scan session to obtain second image scan data;

wherein the medical imaging system comprises an MRI scanner and the plurality of scan types are selected from the group consisting of: T2 Fluid Attenuated Inversion Recovery (FLAIR); diffusion-weighted imaging (DWI); Contrast-enhanced MRI (CE-MRI); Dynamic Contrast-Enhanced MRI (DCE-MRI); gradient echo (GRE); 3D susceptibility weighted imaging (SWI); T2* gradient echo and T1 turbo spin echo (TSE); T1-weighted imaging; T2-weighted imaging; and Susceptibility weighted imaging (SWI).

22. The computer system according to claim 21, wherein step f) further comprises: performing, using the medical imaging system, the second image acquisition sequence during the medical scan session to obtain second image scan data.

23. The computer system according to claim 21, wherein the second image acquisition sequence comprises another plurality of scan types, wherein the other plurality of scan types are selected from the group consisting of: T2 Fluid Attenuated Inversion Recovery (FLAIR); diffusion-weighted imaging (DWI); Contrast-enhanced MRI (CE-MRI); Dynamic Contrast-Enhanced MRI (DCE-MRI); gradient echo (GRE); 3D susceptibility weighted imaging (SWI); T2* gradient echo and T1 turbo spin echo (TSE); T1-weighted imaging; T2-weighted imaging; and Susceptibility weighted imaging (SWI).

* * * * *